United States Patent [19]
Audy

[11] Patent Number: 5,394,019
[45] Date of Patent: Feb. 28, 1995

[54] ELECTRICALLY TRIMMABLE RESISTOR LADDER

[75] Inventor: Jonathan M. Audy, Campbell, Calif.

[73] Assignee: Analog Devices, Inc., Norwood, Mass.

[21] Appl. No.: 104,430

[22] Filed: Aug. 9, 1993

[51] Int. Cl.⁶ .......................... H02H 7/20; H03K 3/26
[52] U.S. Cl. ..................................... 327/525; 338/195; 257/537; 327/524; 327/564
[58] Field of Search ................... 307/202.1, 303, 482.1; 257/529, 536, 537, 539; 338/195, 328, 20, 21

[56] References Cited

U.S. PATENT DOCUMENTS

| | | | |
|---|---|---|---|
| 3,930,304 | 1/1976 | Keller | 257/537 |
| 4,150,366 | 4/1979 | Price | 338/195 |
| 4,225,878 | 9/1980 | Dobkin | 257/536 |
| 4,766,366 | 8/1988 | Davis | 257/536 |
| 4,870,472 | 9/1989 | Vyne | 257/529 |
| 5,065,221 | 11/1991 | Imamura | 338/195 |
| 5,070,383 | 12/1991 | Sinar et al. | 257/537 |
| 5,243,319 | 9/1993 | Brokaw | 338/195 |

OTHER PUBLICATIONS

Licari et al., *Hydrid Microcircuit Technology Handbook*, Noyes Publications, 1988, pp. 132–148.

*Primary Examiner*—David R. Hudspeth
*Assistant Examiner*—Richard Roseen
*Attorney, Agent, or Firm*—Koppel & Jacobs

[57] ABSTRACT

A resistor ladder (10) includes a plurality of series resistors (16,18,20,22,24,26,28) connected in series with each other between a first terminal (12) and a second terminal (14). A plurality of shunt resistors (60,62,64,66, 68,70) are connected between junctions (48,50,52,54,56) of adjacent series resistors and the second terminal (14). The series resistors (16,18,20,22,24,26,28) and shunt resistors (60,62,64,66,68,70) are formed on a substrate (80) as film resistors which blow open at a predetermined current density. The shunt resistors (60,62,64,66,68,70) have a smaller cross-sectional area than the series resistors (16,18,20,22,24,26,28) such that they successively blow open from the first terminal (12) toward the second terminal (14), while the series resistors (16,18,20,22,24,26,28) do not blow open, as a progressively increasing voltage is applied between the first terminal (12) and the second terminal (14). The resistance of the ladder (10) increases as the shunt resistors (60,62,64,66,68,70) are successively blown. The shunt resistors (60,62,64,66,68,70) preferably have twice the resistance as the series resistors (16,18, 20,22,24,26,28), enabling the resistance of the ladder (10) to be electrically trimmed in increments equal to the resistance of each series resistor (16,18,20,22,24,26,28).

18 Claims, 3 Drawing Sheets

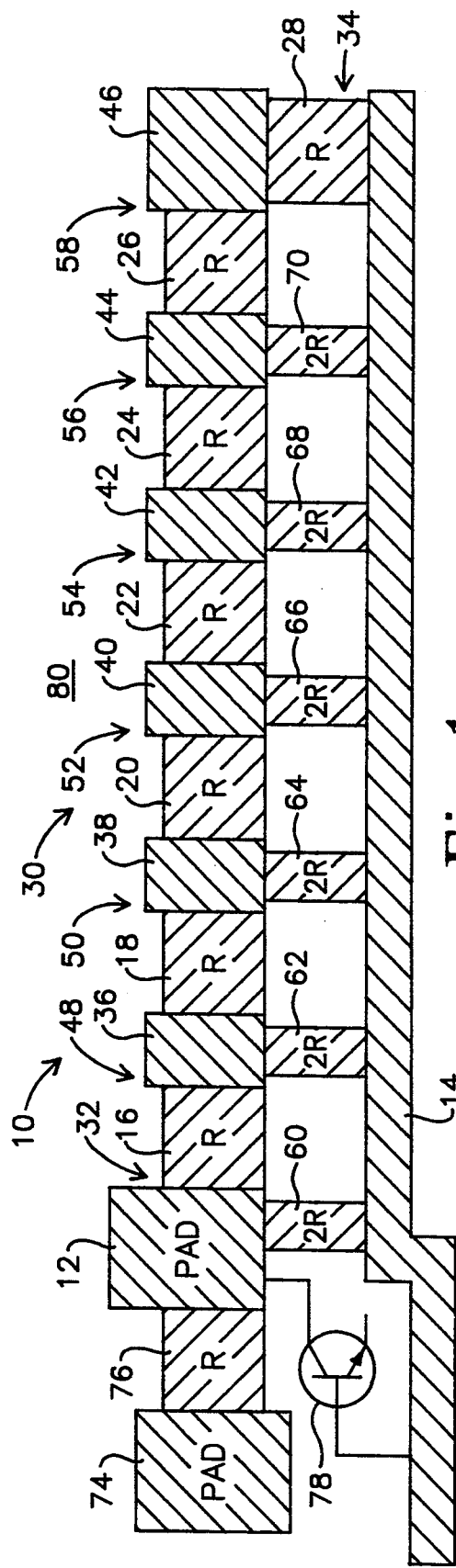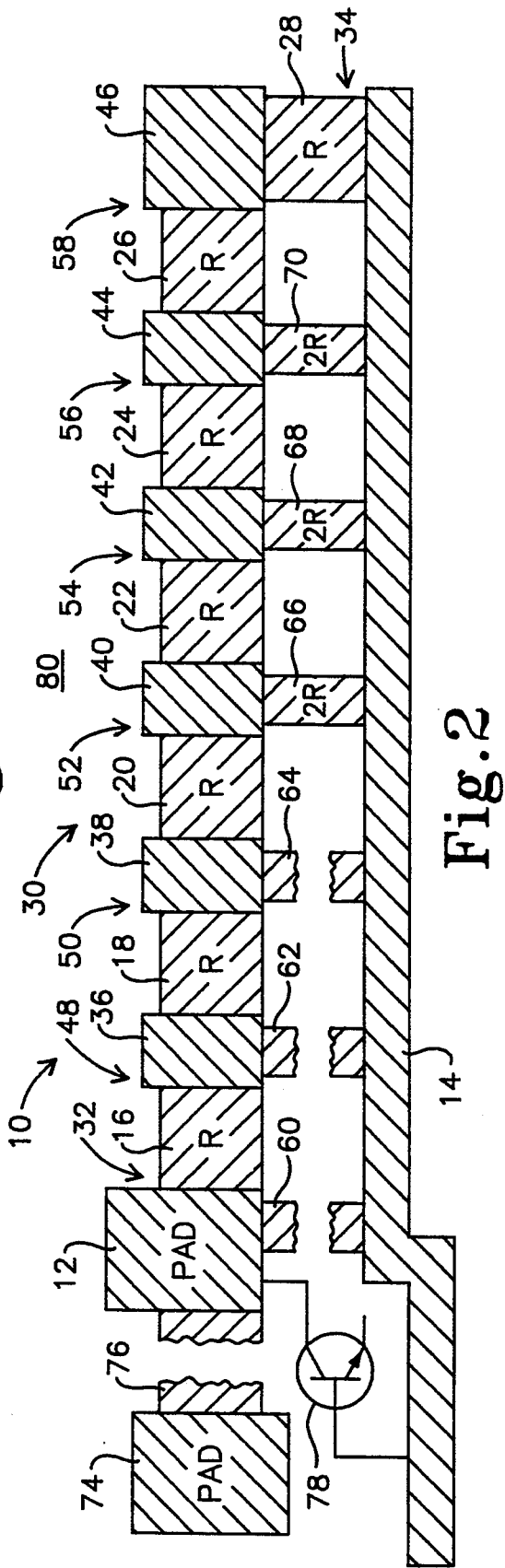

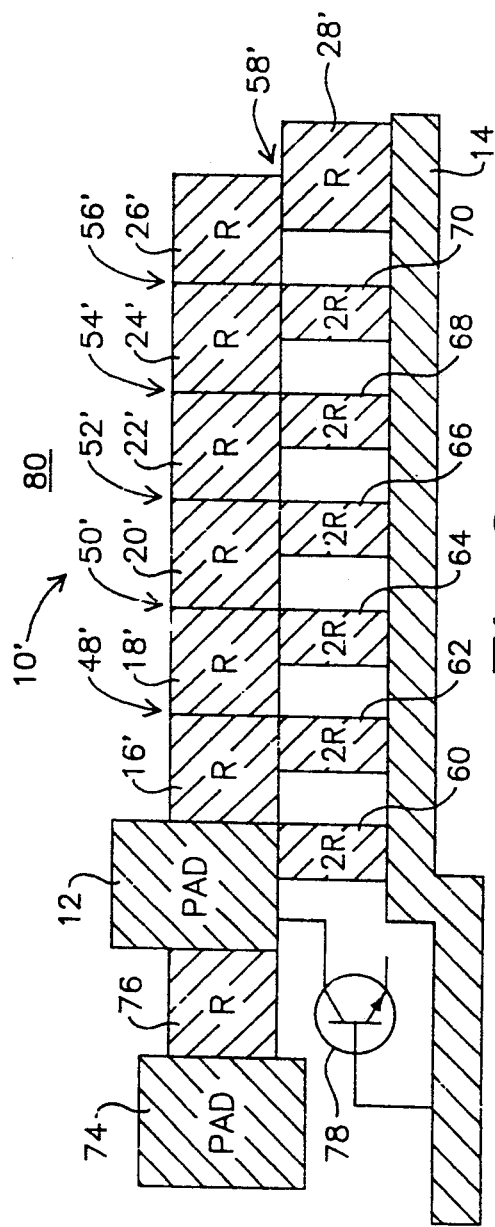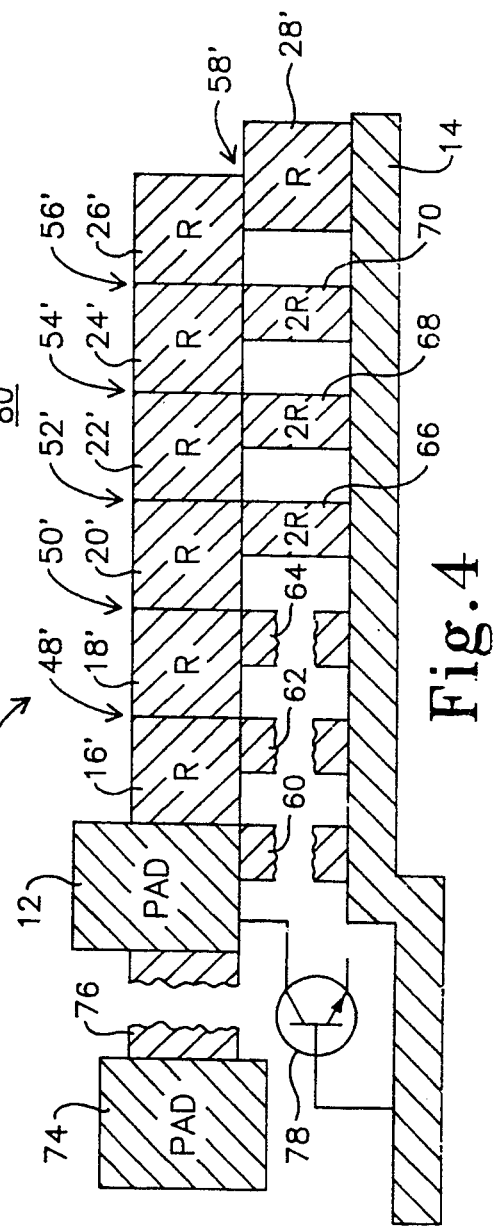

ELECTRICALLY TRIMMABLE RESISTOR LADDER

BACKGROUND OF THE INVENTION

1. Field of the Invention

The present invention generally relates to the art of microelectronics, and more specifically to a resistor ladder which can be electrically programmed or trimmed even after the circuit in which the resistor ladder is incorporated has been encapsulated in a package.

2. Description of the Related Art

Resistors can be advantageously formed on microelectronic integrated circuit substrates by screen printing using special resistive inks which dry to form thick or thin films. The process is economical in that all of the resistors can be formed on a substrate simultaneously, and the screen printing process is inherently inexpensive.

A drawback of this process is that it is not especially precise. Deviations of 20% for thick film resistors and 10% for thin film resistors from their design resistances is not uncommon.

For precision applications, film resistors are trimmed by selective removal of material using a laser or other device to achieve the required resistance. A description of laser trimming of film resistors is presented in a textbook entitled "HYBRID MICROCIRCUIT TECHNOLOGY HANDBOOK", by J. Licari, Noyes Publications, Park Ridge, N.J., 1988, pp. 132-148.

Laser trimming is an expensive and time consuming process, requiring each resistor to be trimmed individually. Another drawback of laser trimming is that it cannot be performed after a microelectronic circuit has been encapsulated in a protective package.

A typical microelectronic circuit will include many film resistors having different resistances. In the conventional design process, each resistor must be individually configured in accordance with its required resistance. The layout of the circuit is therefore complicated, time consuming and expensive.

SUMMARY OF THE INVENTION

A resistor ladder embodying the present invention includes a plurality of series resistors connected in series with each other between a first terminal and a second terminal. A plurality of shunt resistors are connected between the junctions of adjacent series resistors and the second terminal.

The series and shunt resistors are formed on a substrate as film resistors which blow open at a predetermined current density. The shunt resistors have a smaller cross-sectional area than the series resistors such that they successively blow open from the first terminal toward the second terminal, while the series resistors do not blow open, as a progressively increasing voltage is applied between the first and second terminals.

The resistance of the ladder increases as the shunt resistors are successively blown. The shunt resistors preferably have twice the resistance as the series resistors, enabling the resistance of the ladder to be electrically trimmed in increments equal to the resistance of each series resistor.

A trim terminal, trim resistor and reverse blocking diode are provided for electrostatic discharge (ESD) protection. Two or more resistor ladders can be connected in series to provide a wider range of resistance variation in combination with smaller incremental changes.

The present resistor ladder can be electrically trimmed even after the microelectronic circuit in which it is incorporated is encapsulated in a protective package. Electrical trimming of the present resistor ladder to achieve a precise design resistance is substantially simpler, faster less expensive than conventional laser trimming.

The arrangement of the present invention enables a plurality of resistors having different values to be designed and initially formed on a substrate as identical resistor ladders, and subsequently trimmed to the required individual resistances. This modular design substantially reduces the complexity, time and expense of microelectronic circuit layout.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1 is a diagram illustrating an electrically trimmable resistor ladder embodying the present invention prior to trimming;

FIG. 2 is similar to FIG. 1, but illustrates the resistor ladder after trimming;

FIG. 3 is a diagram illustrating another electrically trimmable resistor ladder embodying the present invention prior to trimming;

FIG. 4 is similar to FIG. 3, but illustrates the resistor ladder after trimming.

DETAILED DESCRIPTION OF THE INVENTION

Figure 5:
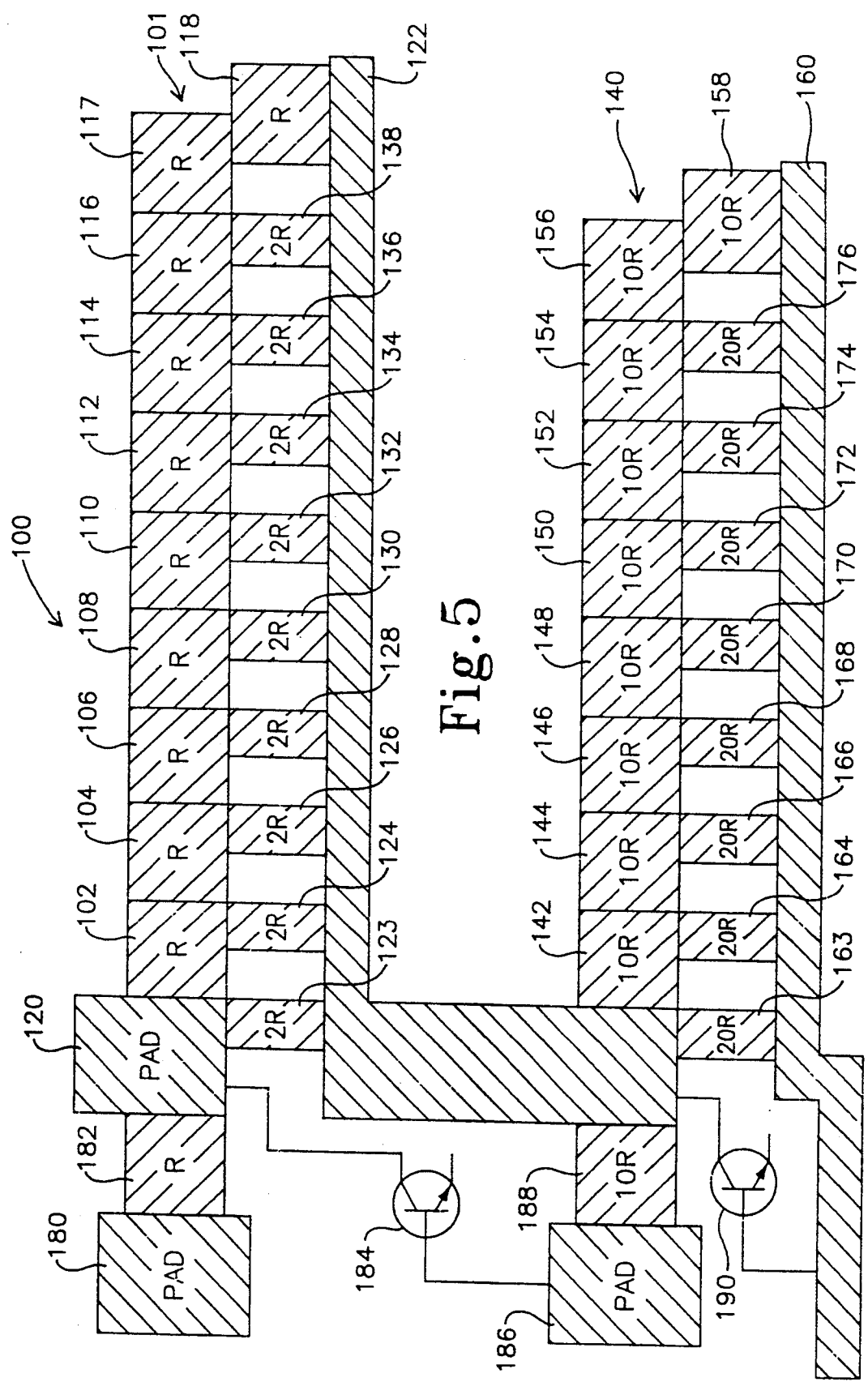
FIG. 5 is a diagram illustrating how two resistor ladders as illustrated in FIGS. 3 and 4 can be connected in series to provide an increased range of resistance variation in combination with smaller incremental changes.

An electrically trimmable resistor ladder 10 embodying the present invention is illustrated in FIGS. 1 and 2 prior and subsequent to trimming respectively. The ladder 10 includes an ohmic metal contact pad which constitutes a first terminal 12, and a conductor metallization strip which constitutes a second terminal 14.

A plurality of series resistors 16, 18, 20, 22, 24, 26 and 28 are connected in series with each other to constitute a series resistor string 30 having a first end 32 connected to the first terminal 12 and a second end 34 connected to the second terminal 14. Adjacent resistors 16, 18, 20, 22, 24, 26 and 28 are interconnected by ohmic metal contacts 36, 38, 40, 42, 44 and 46 which constitute junctions 48, 50, 52, 54, 56 and 58 and separate the adjacent resistors 16,18, 18,20, 20,22, 22,24 and 24,26 and 26,28 from each other respectively.

A plurality of shunt resistors 60, 62, 64, 66, 68 and 70 are formed between the ohmic contacts 36, 38, 40, 42, 44 and 46, and the second terminal 14 respectively. A trim pad or terminal 74 is connected to the first terminal 12 through a blowable trim resistor 76.

An NPN transistor 78 has a collector connected to the first terminal 12, a base connected to the second terminal 14 and a floating emitter. The collector-base junction of the transistor 78 is thereby connected between the first and second terminals 12 and 14, and the transistor 78 functions electrically as a diode.

The resistor ladder 10 further includes an electrically insulating substrate 80 on which the illustrated components are formed. The series resistors 16, 18, 20, 22, 24, 26 and 28, the shunt resistors 60, 62, 64, 66, 68 and 70 and the trim resistor 76 are preferably formed on the substrate 80 as thick or thin film resistors by screen printing or another suitable method. Although only one resistor ladder 10 is illustrated, in an actual application a large number of ladders 10 will be formed on the substrate.

The number of series and shunt resistors is not limited within the scope of the invention, with seven series resistors 16, 18, 20, 22, 24, 26 and 28 and six shunt resistors 60, 62, 64, 66, 68 and 70 being shown by way of example. It will be further noted that the drawings are simplified and not drawn to scale.

In a preferred embodiment of the invention, each series resistor 16, 18, 20, 22, 24, 26 and 28 will have a first predetermined resistance R, whereas each shunt resistor 60, 62, 64, 66, 68 and 70 will have a second predetermined resistance of 2R, or twice the resistance of the series resistors. This enables the ladder 10 to be programmed or trimmed in resistance increments of R. However, the invention is not so limited, and the resistances of the series and shunt resistors can have any desired values.

The ladder 10 as illustrated in FIGS. 1 and 2 has a "R/2R" configuration. The minimum possible resistance of the ladder 10 is R, whereas the maximum possible resistance of the ladder 10 is 7R. The ladder 10 is trimmed by successively electrically blowing open the shunt resistors 60, 62, 64, 66, 68 and 70 from the first terminal 12 toward the second terminal 14. In other words, the shunt resistor 60 will be blown open first, followed by the resistors 62, 64, 66, 68 and 70 in this order.

Assuming that all of the shunt resistors 60, 62, 64, 66, 68 and 70 are blown open (although not explicitly illustrated), the ladder 10 will consist of only the series resistors 16, 18, 20, 22, 24, 26 and 28 which have a combined resistance of 7R. If the shunt resistors 60, 62, 64, 66 and 68 are blown open and the shunt resistor 70 is not blown open, the resistors 70, 26 and 28 will have a combined resistance of R.

More specifically, the resistors 26 and 28 are connected in series and have a combined resistance of 2R. The combined resistance (2R) of the resistors 26 and 28 is connected in parallel with resistance (2R) of the resistor 70. The combined resistance of the resistors 70, 26 and 28 is therefore R, and is connected in series with the five series resistors 16, 18, 20, 22 and 24 such that the resistance of the ladder 10 is 6R.

By extrapolation, blowing open each shunt resistor 60, 62, 64, 66, 68 and 70 increases the resistance of the ladder 10 by an increment of R. FIG. 2 illustrates the shunt resistors 16, 18 and 20 as being blown open such that the ladder 10 has a resistance of 4R.

The series and shunt resistors are designed such that the shunt resistors 60, 62, 64, 66, 68 and 70 will successively blow open as a progressively increasing voltage is applied between the terminals 12 and 14. A higher voltage is required to blow open each successive shunt resistor 60, 62, 64, 66, 68 and 70 because the resistance of the ladder 10 increases as each shunt resistor is blown, and a progressively higher voltage is required to create the same current flow through the next shunt resistor which is to be blown.

Film resistors will blow open at a known current density. Assuming that all of the resistors are made of the same material, it is necessary that the shunt resistors have a smaller cross-sectional area than the series resistors so that the current density in the shunt resistors will exceed the current density in the series resistors at any voltage applied across the terminals 12 and 14.

This enables the shunt resistors to be blown open without the series resistors blowing open. In the R/2R arrangement, the cross-sectional area of each shunt resistor 60, 62, 64, 66, 68 and 70 is approximately one-half that of each series resistor 16, 18, 20, 22, 24, 26 and 28. However, the resistances and cross-sectional areas of the series and shunt resistors are not limited to any particular values within the scope of the invention. It is merely necessary that the shunt resistors blow open and the series resistors do not blow open.

The first terminal 12 is interconnected to other elements in the microelectronic circuit (not shown), and can be enclosed by a cover or other protective encapsulation. The second terminal 14 is typically a ground plane or other reference level, and can be accessed from outside the encapsulation. The trim terminal 74 is provided external of the encapsulation, and enables the ladder 10 to be trimmed after the encapsulation is added to the structure while providing electrostatic discharge (ESD) protection for the circuitry.

For trimming the ladder 10, a voltage is applied to the trim terminal 74 which is positive with reference to the second terminal 14. This reverse biases the collector-base junction of the transistor 78, such that the transistor 78 is effectively disconnected from between terminals 12 and 14. Thus, the ladder 10 can be trimmed vias the trim terminal 74 and the trim resistor 76.

After trimming, a voltage is applied to the trim terminal 74 which is negative with reference to the second terminal 14. This forward biases the collector-base junction of the transistor 78 which provides a low resistance path between the terminals 12 and 14. The negative voltage, which effectively appears across the trim resistor 76, is selected to be high enough to blow open the resistor 76 and thereby disconnect the trim terminal 74 from the first terminal 12. Thus, even if an electrostatic charge is applied to the trim terminal 74 upon subsequent handling and operation of the structure, the charge will not be applied to the ladder 10.

EXAMPLE

The series, shunt and trim resistors are formed of thin film material which blows open at a typical current density of 200 microamperes per micrometer. R=2K ohms, whereas 2R=4K ohms. It will be assumed that the film thickness of all of the resistors is the same. Since cross-sectional area is equal to width times thickness, the current densities in the resistors are proportional to their widths.

The width of each series resistor 16, 18, 20, 22, 24, 26 and 28 and the trim resistor 76 is selected to be 12 micrometers, whereas the width of each shunt resistor 60, 62, 64, 66, 68 and 70 is 5 micrometers. With the trim resistor 76 included, the resistance of the ladder 10 is initially 2R. All of the current into the ladder 10 will flow through the trim resistor 76, and will then divide equally through the shunt resistor 60 (which has a resistance of 2R) and all of the other resistors (which have a combined resistance of 2R).

The current I required to blow open the resistor 60 is I=200 milliamperes per micrometer ×5 micrometers =one milliampere, and the current into the ladder 10 must be 2 milliamperes. The voltage V which must be applied between the trim terminal 74 and the second terminal 14 to cause one milliampere of current to flow through the resistor 60 is therefore V=2 milliamperes ×4K ohms=8 volts.

Blowing open each shunt resistor 60, 62, 64, 66, 68 and 70 adds an increment of R to the resistance of the ladder 10. The voltage must therefore be increased in increments of ΔV=2 milliamperes ×2K ohms=4 volts to blow open each successive shunt resistor 60, 62, 64, 66, 68 and 70. The voltage required to blow open the last shunt resistor 70 is 32 volts.

The current I required to blow open the trim resistor 76 is I=200 milliamperes per micrometer ×12 micrometers=2.4 milliamperes, and the voltage V required to blow open the trim resistor 76 is V=2.4 milliamperes ×2K ohms=4.8 volts.

Electrical trimming of the present resistor ladder 10 to achieve a precise design resistance is substantially simpler, faster less expensive than conventional laser trimming, since all that is required is to apply a predetermined voltage between the trim terminal 74 and the second terminal 14 to achieve a desired resistance.

In addition, the arrangement of the present invention enables a plurality of resistors having different values to be designed and initially formed on a substrate as identical resistor ladders 10, and subsequently trimmed to the required individual resistances. This modular design substantially reduces the complexity, time and expense of microelectronic circuit layout.

FIGS. 3 and 4 illustrate another resistor ladder 10' embodying the present invention in which like elements are designated by the same reference numerals used in FIGS. 1 and 2, and corresponding but modified elements are designated by the same reference numerals primed.

The ladder 10' differs from the ladder 10 in that the ohmic metal contacts 36, 38, 40, 42, 44 and 46 are omitted, and series resistors 16', 18', 20', 22', 24', 26' and 28', are connected directly together at junctions 48', 50', 52', 54', 56' and 58' respectively The cross-sectional width of each shunt resistor 60, 62, 64, 66, 68 and 70 is one-third the cross-sectional width of each series resistor 16', 18', 20', 22', 24'26' and 28'.

In this embodiment, the series resistors 16', 18', 20', 22', 24', 26' and 28' are preferably formed integrally as one continuous, longitudinally elongated resistor, and the shunt resistors 60, 62, 64, 66, 68 and 70 are connected thereto at longitudinally spaced locations which constitute the junctions 48', 50', 52', 54', 56', and 58' respectively.

The ladder 10; is advantageous in that it is easier to fabricate and takes up less space on the substrate 80 than the ladder 10. However, the ladder 10' is not as precise as the ladder 10, in that the shunt resistors 60, 62, 64, 66, 68 and 70 will be blown, in actual practice, at slightly different locations along their lengths.

The portions of the shunt resistors 60, 62, 64, 66, 68 and 70 which remain connected to the respective series resistors 16', 18', 20', 22', 24', 26' and 28' locally increase the widths of the series resistors in an unpredictable manner, thus introducing a small element of uncertainty into the final resistance of the ladder 10'.

This effect is not present in the ladder 10 because the series resistors 16, 18, 20, 22, 24, 26 and 28 are interconnected by the ohmic contacts 36, 38, 40, 42, 44 and 46 which have much lower resistance than the shunt resistors 60, 62, 64, 66, 68 and 70.

FIG. 5 illustrates another resistor ladder 100 embodying the present invention which essentially consists of two ladders 10' connected in series. Although not specifically illustrated, the concept of FIG. 5 is equally applicable to the ladder 10.

The arrangement of two resistor ladders connected in series enables the ladder 100 to have a larger range of resistance variation than the ladders 10 and 10', and/or a smaller incremental change in resistance. In the example illustrated, the resistance of the ladder 100 is variable from 11R to 99R in increments of R.

The ladder 100 includes a first section 101 including 10 series resistors 102, 104, 106, 108, 110, 112, 114, 116, 117 and 118 which are connected in series with each other between a first terminal 120 and a second terminal 122. Each of these series resistors has a resistance of R.

Nine shunt resistors 123, 124, 126, 128, 130, 132, 134, 136 and 138 are connected between the first terminal 120 and the junctions (not designated) of the respective series resistors 102, 104, 106, 108, 110, 112, 114, 116, 117 and 118, and the second terminal 122 in the manner described above with reference to FIGS. 3 and 4. Each of the shunt resistors has a resistance of 2R.

The ladder 100 further includes a second section 140 including nine series resistors 142, 144, 146, 148, 150, 152, 154, 156 and 158 which are connected in series with each other between the second terminal 122 and a third terminal 160. Each of these series resistors has a resistance of 10R. Eight shunt resistors 163, 164, 166, 168, 170, 172, 174 and 176 are connected between the second terminal 122 and junctions of the respective series resistors, and the third terminal 160. Each of the shunt resistors has a resistance of 20R.

Further illustrated are a first ESD protection circuit including a first trim terminal 180 which is connected to the first terminal 120 through a first blowable trim resistor 182 having a resistance of R, and a floating emitter NPN transistor 184 whose collector is connected to the first terminal 120 and whose base is connected a second trim terminal 186.

A second ESD protection circuit includes the second trim terminal 186 which is connected to the second terminal 122 by a second blowable trim resistor 188 having a floating emitter NPN resistance of 10R, and a transistor 190 whose collector is connected to the second terminal 122 and whose base is connected to the third terminal 160.

The first terminal 120 and the third terminal 160 constitute the ends of the ladder 100 for operation after trimming or programming. The ladder 100 has a resistance of 11R with no resistors blown. The resistance of the first section 101 is R, the resistance of the second section 140 is 10R, and the sections 101 and 140 are connected in series with each other such that the resistances of the two sections 101 and 140 are added together.

The sections 101 and 140 can both be trimmed to provide any resistance between 11R and 99R in increments of R. The second section 140 is trimmed to provide the upper decade increment (10R to 90R in increments of 10R), and the first section 101 is trimmed to provide the lower decade increment (1R to 10R in increments of R).

Since the sections 101 and 140 are connected in series with each other, the lower decade increment is added to the upper decade increment. For example, if the resistors 123, 124 and 126 are blown open such that the resistance of the first section 101 is 4R, and the resistors 163, 164, 166, 168, 170, 172 and 174 are blown open such that the resistance of the second section 140 is 80R, the resistance of the ladder 100 taken between the terminals 120 and 160 will be 4R+80R=84R.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. An electrically trimmable resistor ladder, comprising:
   a plurality of series resistors which are connected in series with each other to constitute a string having a first end and a second end; and
   a plurality of shunt resistors which are connected between respective junctions of adjacent series resistors and said second end of said string;
   the series resistors and the shunt resistors being configured such that the shunt resistors successively blow open from said first end toward said second end of said string, while the series resistors do not blow open, in response to a progressively increasing electrical voltage applied between said first and second ends of said string.

2. A resistor ladder as in claim 1, in which:
   the shunt resistors and the series resistors are made of the same material; and
   the shunt resistors have a smaller cross-sectional area than the series resistors.

3. A resistor ladder as in claim 1, in which:
   the shunt resistors and the series resistors are made of a material which blows open at a predetermined current density; and
   the shunt resistors have a smaller cross-sectional area than the series resistors.

4. A resistor ladder as in claim 1, in which each of said junctions comprises an ohmic contact which separates said adjacent series resistors from each other.

5. A resistor ladder as in claim 4, in which each ohmic contact further separates said adjacent series resistors from said shunt resistor.

6. A resistor ladder as in claim 1, further comprising:
   a first terminal connected to said first end of said string;
   a second terminal connected to said second end of said string;
   a trim terminal; and
   a blowable trim resistor connected between the trim terminal and the first terminal.

7. A resistor ladder as in claim 6, further comprising a diode connected between the first terminal and the second terminal.

8. A resistor ladder as in claim 7, in which the diode comprises a bipolar transistor having a collector connected to the first terminal, a base connected to the second terminal and a floating emitter.

9. A resistor ladder as in claim 7, in which:
   each series resistor has a predetermined resistance; and
   the trim resistor has said predetermined resistance.

10. A resistor ladder as in claim 1, in which:
    each series resistor has a first predetermined resistance; and
    each shunt resistor has a second predetermined resistance which is twice said first predetermined resistance.

11. A resistor ladder as in claim 1, further comprising an electrically insulating substrate; in which
    the series resistors and the shunt resistors are respective film resistors formed on the substrate.

12. A resistor ladder as in claim 11, in which the shunt resistors have a smaller cross-sectional area than the series resistors.

13. A resistor ladder as in claim 11, in which:
    each series resistor has a first predetermined resistance; and
    each shunt resistor has a second predetermined resistance which is twice said first predetermined resistance.

14. An electrically trimmable resistor ladder, comprising:
    an elongated series resistor having first and second longitudinal ends; and
    a plurality of shunt resistors which are connected between respective longitudinally spaced locations on the series resistor and said second end of the series resistor;
    the series resistor and the shunt resistors being configured such that the shunt resistors successively blow open from said first end toward said second end of the series resistor, while the series resistor does not blow open, in response to a progressively increasing electrical voltage applied between said first and second ends of the series resistor.

15. An electrically trimmable resistor ladder, comprising:
    first and second terminals;
    a plurality of first series resistors which are connected in series with each other between the first and second terminals;
    a plurality of first shunt resistors which are connected between respective junctions of adjacent first series resistors and the second terminal;
    a first trim terminal;
    a first blowable trim resistor connected between the first trim terminal and the first terminal;
    a third terminal;
    a plurality of second series resistors which are connected in series with each other between the second and third terminals;
    a plurality of second shunt resistors which are connected between respective junctions of adjacent second series resistors and the third terminal;
    a second trim terminal; and
    a second trim resistor connected between the second trim terminal and the second terminal;
    the first series resistors and the first shunt resistors being configured such that the first shunt resistors successively blow open from the first terminal toward the second terminal, while the first series resistors do not blow open, in response to a progressively increasing electrical voltage applied between the first and second trim terminals; and
    the second series resistors and the second shunt resistors being configured such that the second shunt resistors successively blow open from the second terminal toward the third terminal, while the second series resistors do not blow open, in response to a progressively increasing electrical voltage applied between the second trim terminal and the third terminal.

16. A resistor ladder as in claim 15, in which:

the first series resistors each have a first predetermined resistance;

the first shunt resistors each have a second predetermined resistance which is different from said first predetermined resistance;

the second series resistors each have a third predetermined resistance which is different from said first predetermined resistance; and the second shunt resistors each have a fourth predetermined resistance which is different from said second predetermined resistance.

17. A resistor ladder as in claim 16, in which:

said second predetermined resistance is twice said first predetermined resistance; and said fourth predetermined resistance is twice said third predetermined resistance.

18. A resistor ladder as in claim 15, further comprising:

a first diode connected between the first terminal and the second trim third terminal; and a second diode connected between the second terminal and the third terminal.

* * * * *